(12) United States Patent
Eliaz et al.

(10) Patent No.: US 8,948,321 B2
(45) Date of Patent: Feb. 3, 2015

(54) REDUCED STATE SEQUENCE ESTIMATION WITH SOFT DECISION OUTPUTS

(71) Applicant: MagnaCom Ltd., Moshav Ben Shemen (IL)

(72) Inventors: Amir Eliaz, Moshav Ben Shemen (IL); Ilan Reuven, Ganey Tikva (IL)

(73) Assignee: MagnaCom Ltd. (IL)

( * ) Notice: Subject to any disclaimer, the term of this patent is extended or adjusted under 35 U.S.C. 154(b) by 0 days.

(21) Appl. No.: 14/187,436

(22) Filed: Feb. 24, 2014

(65) Prior Publication Data

US 2014/0233683 A1     Aug. 21, 2014

Related U.S. Application Data

(63) Continuation of application No. 13/922,329, filed on Jun. 20, 2013, now Pat. No. 8,666,000.

(60) Provisional application No. 61/662,085, filed on Jun. 20, 2012, provisional application No. 61/726,099, filed on Nov. 14, 2012, provisional application No. 61/729,774, filed on Nov. 26, 2012, provisional application No. 61/747,132, filed on Dec. 28, 2012, provisional application No. 61/768,532, filed on Feb. 24, 2013, provisional application No. 61/807,813, filed on Apr. 3, 2013.

(51) Int. Cl.
*H03D 1/00*     (2006.01)
*H04L 27/06*    (2006.01)
*H04L 1/00*     (2006.01)
*H04L 25/03*    (2006.01)
*H04L 27/26*    (2006.01)
*H04L 25/02*    (2006.01)

(52) U.S. Cl.
CPC ........ *H04L 1/0054* (2013.01); *H04L 25/03821* (2013.01); *H04L 27/2628* (2013.01); *H04L 25/02* (2013.01); *H04L 2025/03414* (2013.01); *H04L 2025/03522* (2013.01)
USPC ............ 375/343; 375/152; 375/342; 375/346

(58) Field of Classification Search
CPC ................................................. H04L 27/2628
USPC .................................. 375/343, 143, 152, 346
See application file for complete search history.

(56) References Cited

U.S. PATENT DOCUMENTS 4,109,101 A    8/1978  Mitani
4,135,057 A    1/1979  Bayless, Sr. et al.
(Continued)

OTHER PUBLICATIONS

Equalization: The Correction and Analysis of Degraded Signals, White Paper, Agilent Technologies, Ransom Stephens V1.0, Aug. 15, 2005 (12 pages).

(Continued)

*Primary Examiner* — Qutbuddin Ghulamali
(74) *Attorney, Agent, or Firm* — McAndrews, Held & Malloy, Ltd.

(57) ABSTRACT

A receiver may be operable to receive an inter-symbol correlated (ISC) signal, and generate a plurality of soft decisions as to information carried in the ISC signal. The soft decisions may be generated using a reduced-state sequence estimation (RSSE) process. The RSSE process may be such that the number of symbol survivors retained after each iteration of the RSSE process is less than the maximum likelihood state space. The plurality of soft decisions may comprise a plurality of log likelihood ratios (LLRs). Each of the plurality of LLRs may correspond to a respective one of a plurality of subwords of a forward error correction (FEC) codeword.

20 Claims, 10 Drawing Sheets

(56) References Cited

U.S. PATENT DOCUMENTS

| | | | |
|---|---|---|---|
| 4,797,925 A | 1/1989 | Lin | |
| 5,111,484 A * | 5/1992 | Karabinis | 375/340 |
| 5,131,011 A * | 7/1992 | Bergmans et al. | 375/348 |
| 5,202,903 A * | 4/1993 | Okanoue | 375/347 |
| 5,249,200 A | 9/1993 | Chen et al. | |
| 5,283,813 A | 2/1994 | Shalvi et al. | |
| 5,291,516 A | 3/1994 | Dixon et al. | |
| 5,394,439 A | 2/1995 | Hemmati | |
| 5,459,762 A | 10/1995 | Wang et al. | |
| 5,590,121 A | 12/1996 | Geigel et al. | |
| 5,602,507 A | 2/1997 | Suzuki | |
| 5,757,855 A | 5/1998 | Strolle et al. | |
| 5,784,415 A | 7/1998 | Chevillat et al. | |
| 5,818,653 A | 10/1998 | Park et al. | |
| 5,886,748 A | 3/1999 | Lee | |
| 5,889,823 A | 3/1999 | Agazzi et al. | |
| 5,915,213 A | 6/1999 | Iwatsuki et al. | |
| 5,930,309 A | 7/1999 | Knutson et al. | |
| 6,009,120 A | 12/1999 | Nobakht | |
| 6,167,079 A | 12/2000 | Kinnunen et al. | |
| 6,233,709 B1 | 5/2001 | Zhang et al. | |
| 6,272,173 B1 | 8/2001 | Hatamian | |
| 6,335,954 B1 | 1/2002 | Bottomley et al. | |
| 6,516,437 B1 | 2/2003 | Van Stralen et al. | |
| 6,532,256 B2 * | 3/2003 | Miller | 375/222 |
| 6,535,549 B1 | 3/2003 | Scott et al. | |
| 6,697,441 B1 | 2/2004 | Bottomley et al. | |
| 6,785,342 B1 | 8/2004 | Isaksen et al. | |
| 6,871,208 B1 | 3/2005 | Guo et al. | |
| 6,968,021 B1 | 11/2005 | White et al. | |
| 6,985,709 B2 | 1/2006 | Perets | |
| 7,158,324 B2 | 1/2007 | Stein et al. | |
| 7,190,288 B2 | 3/2007 | Robinson et al. | |
| 7,205,798 B1 | 4/2007 | Agarwal et al. | |
| 7,206,363 B2 | 4/2007 | Hegde et al. | |
| 7,215,716 B1 | 5/2007 | Smith | |
| 7,467,338 B2 | 12/2008 | Saul | |
| 7,830,854 B1 | 11/2010 | Sarkar et al. | |
| 7,974,230 B1 | 7/2011 | Talley et al. | |
| 8,005,170 B2 | 8/2011 | Lee et al. | |
| 8,059,737 B2 | 11/2011 | Yang | |
| 8,175,186 B1 | 5/2012 | Wiss et al. | |
| 8,199,804 B1 * | 6/2012 | Cheong | 375/233 |
| 8,248,975 B2 | 8/2012 | Fujita et al. | |
| 8,351,536 B2 | 1/2013 | Mazet et al. | |
| 8,422,589 B2 | 4/2013 | Golitschek Elder Von Elbwart et al. | |
| 8,526,523 B1 | 9/2013 | Eliaz | |
| 8,548,072 B1 | 10/2013 | Eliaz | |
| 8,548,089 B2 | 10/2013 | Agazzi et al. | |
| 8,548,097 B1 | 10/2013 | Eliaz | |
| 8,553,821 B1 | 10/2013 | Eliaz | |
| 8,559,494 B1 | 10/2013 | Eliaz | |
| 8,559,496 B1 | 10/2013 | Eliaz | |
| 8,559,498 B1 | 10/2013 | Eliaz | |
| 8,565,363 B1 | 10/2013 | Eliaz | |
| 8,566,687 B1 | 10/2013 | Eliaz | |
| 8,571,131 B1 | 10/2013 | Eliaz | |
| 8,571,146 B1 | 10/2013 | Eliaz | |
| 8,572,458 B1 | 10/2013 | Eliaz | |
| 8,582,637 B1 | 11/2013 | Eliaz | |
| 8,599,914 B1 | 12/2013 | Eliaz | |
| 8,605,832 B1 | 12/2013 | Eliaz | |
| 8,666,000 B2 * | 3/2014 | Eliaz et al. | 375/341 |
| 8,675,769 B1 | 3/2014 | Eliaz | |
| 8,675,782 B2 | 3/2014 | Eliaz | |
| 8,681,889 B2 | 3/2014 | Eliaz et al. | |
| 8,744,003 B2 | 6/2014 | Eliaz | |
| 2001/0008542 A1 | 7/2001 | Wiebke et al. | |
| 2001/0028677 A1 * | 10/2001 | Wang et al. | 375/148 |
| 2002/0016938 A1 | 2/2002 | Starr | |
| 2002/0123318 A1 | 9/2002 | Lagarrigue | |
| 2002/0150065 A1 | 10/2002 | Ponnekanti | |
| 2002/0150184 A1 | 10/2002 | Hafeez et al. | |
| 2002/0172297 A1 | 11/2002 | Ouchi et al. | |
| 2003/0016741 A1 | 1/2003 | Sasson et al. | |
| 2003/0135809 A1 | 7/2003 | Kim | |
| 2003/0210352 A1 | 11/2003 | Fitzsimmons et al. | |
| 2004/0037374 A1 | 2/2004 | Gonikberg | |
| 2004/0086276 A1 | 5/2004 | Lenosky et al. | |
| 2004/0120409 A1 | 6/2004 | Yasotharan et al. | |
| 2004/0142666 A1 | 7/2004 | Creigh et al. | |
| 2004/0170228 A1 | 9/2004 | Vadde | |
| 2004/0174937 A1 | 9/2004 | Ungerboeck | |
| 2004/0227570 A1 | 11/2004 | Jackson et al. | |
| 2004/0240578 A1 | 12/2004 | Thesling | |
| 2004/0257955 A1 | 12/2004 | Yamanaka et al. | |
| 2005/0047517 A1 | 3/2005 | Georgios et al. | |
| 2005/0123077 A1 | 6/2005 | Kim | |
| 2005/0135472 A1 | 6/2005 | Higashino | |
| 2005/0220218 A1 | 10/2005 | Jensen et al. | |
| 2005/0265470 A1 | 12/2005 | Kishigami et al. | |
| 2005/0276317 A1 | 12/2005 | Jeong et al. | |
| 2006/0067396 A1 | 3/2006 | Christensen | |
| 2006/0109780 A1 | 5/2006 | Fechtel | |
| 2006/0171489 A1 | 8/2006 | Ghosh et al. | |
| 2006/0239339 A1 | 10/2006 | Brown et al. | |
| 2006/0245765 A1 | 11/2006 | Elahmadi et al. | |
| 2006/0280113 A1 | 12/2006 | Huo | |
| 2007/0092017 A1 | 4/2007 | Abedi | |
| 2007/0098090 A1 | 5/2007 | Ma et al. | |
| 2007/0098116 A1 | 5/2007 | Kim | |
| 2007/0110177 A1 | 5/2007 | Molander et al. | |
| 2007/0110191 A1 | 5/2007 | Kim | |
| 2007/0127608 A1 | 6/2007 | Scheim et al. | |
| 2007/0140330 A1 | 6/2007 | Allpress et al. | |
| 2007/0189404 A1 | 8/2007 | Baum et al. | |
| 2007/0213087 A1 | 9/2007 | Laroia et al. | |
| 2007/0230593 A1 | 10/2007 | Eliaz et al. | |
| 2007/0258517 A1 | 11/2007 | Rollings et al. | |
| 2007/0291719 A1 | 12/2007 | Demirhan et al. | |
| 2008/0002789 A1 | 1/2008 | Jao et al. | |
| 2008/0049598 A1 | 2/2008 | Ma et al. | |
| 2008/0080644 A1 | 4/2008 | Batruni | |
| 2008/0130716 A1 | 6/2008 | Cho et al. | |
| 2008/0130788 A1 | 6/2008 | Copeland | |
| 2008/0159377 A1 | 7/2008 | Allpress et al. | |
| 2008/0207143 A1 | 8/2008 | Skarby et al. | |
| 2008/0260985 A1 | 10/2008 | Shirai et al. | |
| 2009/0003425 A1 | 1/2009 | Shen et al. | |
| 2009/0028234 A1 | 1/2009 | Zhu | |
| 2009/0075590 A1 | 3/2009 | Sahinoglu et al. | |
| 2009/0086808 A1 | 4/2009 | Liu et al. | |
| 2009/0122854 A1 | 5/2009 | Zhu et al. | |
| 2009/0185612 A1 | 7/2009 | McKown | |
| 2009/0213908 A1 | 8/2009 | Bottomley | |
| 2009/0290620 A1 | 11/2009 | Tzannes et al. | |
| 2009/0323841 A1 | 12/2009 | Clerckx et al. | |
| 2010/0002692 A1 | 1/2010 | Bims | |
| 2010/0034253 A1 | 2/2010 | Cohen | |
| 2010/0039100 A1 | 2/2010 | Sun et al. | |
| 2010/0062705 A1 | 3/2010 | Rajkotia et al. | |
| 2010/0074349 A1 | 3/2010 | Hyllander et al. | |
| 2010/0166050 A1 | 7/2010 | Aue | |
| 2010/0172309 A1 | 7/2010 | Forenza et al. | |
| 2010/0202505 A1 | 8/2010 | Yu et al. | |
| 2010/0202507 A1 | 8/2010 | Allpress et al. | |
| 2010/0208774 A1 | 8/2010 | Guess et al. | |
| 2010/0215107 A1 | 8/2010 | Yang | |
| 2010/0220825 A1 | 9/2010 | Dubuc | |
| 2010/0278288 A1 | 11/2010 | Panicker et al. | |
| 2010/0284481 A1 | 11/2010 | Murakami et al. | |
| 2010/0309796 A1 | 12/2010 | Khayrallah | |
| 2010/0329325 A1 | 12/2010 | Mobin et al. | |
| 2011/0051864 A1 | 3/2011 | Chalia et al. | |
| 2011/0064171 A1 | 3/2011 | Huang et al. | |
| 2011/0074500 A1 | 3/2011 | Bouillet et al. | |
| 2011/0074506 A1 | 3/2011 | Kleider et al. | |
| 2011/0090986 A1 | 4/2011 | Kwon et al. | |
| 2011/0134899 A1 | 6/2011 | Jones, IV | |
| 2011/0150064 A1 | 6/2011 | Kim et al. | |
| 2011/0164492 A1 | 7/2011 | Ma et al. | |
| 2011/0188550 A1 | 8/2011 | Wajcer et al. | |
| 2011/0228869 A1 | 9/2011 | Barsoum et al. | |

(56) References Cited

U.S. PATENT DOCUMENTS

| | | |
|---|---|---|
| 2011/0243266 A1 | 10/2011 | Roh |
| 2011/0275338 A1 | 11/2011 | Seshadri et al. |
| 2011/0310823 A1 | 12/2011 | Nam et al. |
| 2011/0310978 A1 | 12/2011 | Wu et al. |
| 2012/0051464 A1 | 3/2012 | Kamuf et al. |
| 2012/0106617 A1 | 5/2012 | Jao et al. |
| 2012/0207248 A1 | 8/2012 | Ahmed et al. |
| 2013/0028299 A1 | 1/2013 | Tsai |
| 2013/0044877 A1 | 2/2013 | Liu et al. |
| 2013/0121257 A1 | 5/2013 | He et al. |

OTHER PUBLICATIONS

Modulation and Coding for Linear Gaussian Channels, G. David Forney, Jr., and Gottfried Ungerboeck, IEEE Transactions of Information Theory, vol. 44, No. 6, Oct. 1998 pp. 2384-2415 (32 pages).

Intuitive Guide to Principles of Communications, www.complextoreal.com, Inter Symbol Interference (ISI) and Root-raised Cosine (RRC) filtering, (2002), pp. 1-23 (23 pages).

Chan, N., "Partial Response Signaling with a Maximum Likelihood Sequence Estimation Receiver" (1980). Open Access Dissertations and Theses. Paper 2855, (123 pages).

The Viterbi Algorithm, Ryan, M.S. and Nudd, G.R., Department of Computer Science, Univ. of Warwick, Coventry, (1993) (17 pages).

R. A. Gibby and J. W. Smith, "Some extensions of Nyquist's telegraph transmission theory," Bell Syst. Tech. J., vol. 44, pp. 1487-1510, Sep. 1965.

J. E. Mazo and H. J. Landau, "On the minimum distance problem for faster-than-Nyquist signaling," IEEE Trans. Inform. Theory, vol. 34, pp. 1420-1427, Nov. 1988.

D. Hajela, "On computing the minimum distance for faster than Nyquist signaling," IEEE Trans. Inform. Theory, vol. 36, pp. 289-295, Mar. 1990.

G. Ungerboeck, "Adaptive maximum-likelihood receiver for carrier modulated data-transmission systems," IEEE Trans. Commun., vol. 22, No. 5, pp. 624-636, May 1974.

G. D. Forney, Jr., "Maximum-likelihood sequence estimation of digital sequences in the presence of intersymbol interference," IEEE Trans. Inform. Theory, vol. 18, No. 2, pp. 363-378, May 1972.

A. Duel-Hallen and C. Heegard, "Delayed decision-feedback sequence estimation," IEEE Trans. Commun., vol. 37, pp. 428-436, May 1989.

M. V. Eyubog •Iu and S. U. Qureshi, "Reduced-state sequence estimation with set partitioning and decision feedback," IEEE Trans. Commun., vol. 36, pp. 13-20, Jan. 1988.

W. H. Gerstacker, F. Obernosterer, R. Meyer, and J. B. Huber, "An efficient method for prefilter computation for reduced-state equalization," Proc. Of the 11th IEEE Int. Symp. Personal, Indoor and Mobile Radio Commun. PIMRC, vol. 1, pp. 604-609, London, UK, Sep. 18-21, 2000.

W. H. Gerstacker, F. Obernosterer, R. Meyer, and J. B. Huber, "On prefilter computation for reduced-state equalization," IEEE Trans. Wireless Commun., vol. 1, No. 4, pp. 793-800, Oct. 2002.

Joachim Hagenauer and Peter Hoeher, "A Viterbi algorithm with soft-decision outputs and its applications," in Proc. IEEE Global Telecommunications Conference 1989, Dallas, Texas, pp. 1680-1686, Nov. 1989.

S. Mita, M. Izumita, N. Doi, and Y. Eto, "Automatic equalizer for digital magnetic recording systems" IEEE Trans. Magn., vol. 25, pp. 3672-3674, 1987.

E. Biglieri, E. Chiaberto, G. P. Maccone, and E. Viterbo, "Compensation of nonlinearities in high-density magnetic recording channels," IEEE Trans. Magn., vol. 30, pp. 5079-5086, Nov. 1994.

W. E. Ryan and A. Gutierrez, "Performance of adaptive Volterra equalizers on nonlinear magnetic recording channels," IEEE Trans. Magn., vol. 31, pp. 3054-3056, Nov. 1995.

X. Che, "Nonlinearity measurements and write precompensation studies for a PRML recording channel," IEEE Trans. Magn., vol. 31, pp. 3021-3026, Nov. 1995.

O. E. Agazzi and N. Sheshadri, "On the use of tentative decisions to cancel intersymbol interference and nonlinear distortion (with application to magnetic recording channels)," IEEE Trans. Inform. Theory, vol. 43, pp. 394-408, Mar. 1997.

Miao, George J., Signal Processing for Digital Communications, 2006, Artech House, pp. 375-377.

Xiong, Fuqin. Digital Modulation Techniques, Artech House, 2006, Chapter 9, pp. 447-483.

Faulkner, Michael, "Low-Complex ICI Cancellation for Improving Doppler Performance in OFDM Systems", Center for Telecommunication and Microelectronics, 1-4244-0063-5/06/$2000 (c) 2006 IEEE. (5 pgs).

Stefano Tomasin, et al. "Iterative Interference Cancellation and Channel Estimation for Mobile OFDM", IEEE Transactions on Wireless Communications, vol. 4, No. 1, Jan. 2005, pp. 238-245.

Int'l Search Report and Written Opinion for PCT/IB2013/01866 dated Mar. 21, 2014.

Int'l Search Report and Written Opinion for PCT/IB2013/001923 dated Mar. 21, 2014.

Int'l Search Report and Written Opinion for PCT/IB2013/001878 dated Mar. 21, 2014.

Int'l Search Report and Written Opinion for PCT/IB2013/002383 dated Mar. 21, 2014.

Int'l Search Report and Written Opinion for PCT/IB2013/01860 dated Mar. 21, 2014.

Int'l Search Report and Written Opinion for PCT/IB2013/01970 dated Mar. 27, 2014.

Int'l Search Report and Written Opinion for PCT/IB2013/01930 dated May 15, 2014.

Int'l Search Report and Written Opinion for PCT/IB2013/02081 dated May 22, 2014.

* cited by examiner

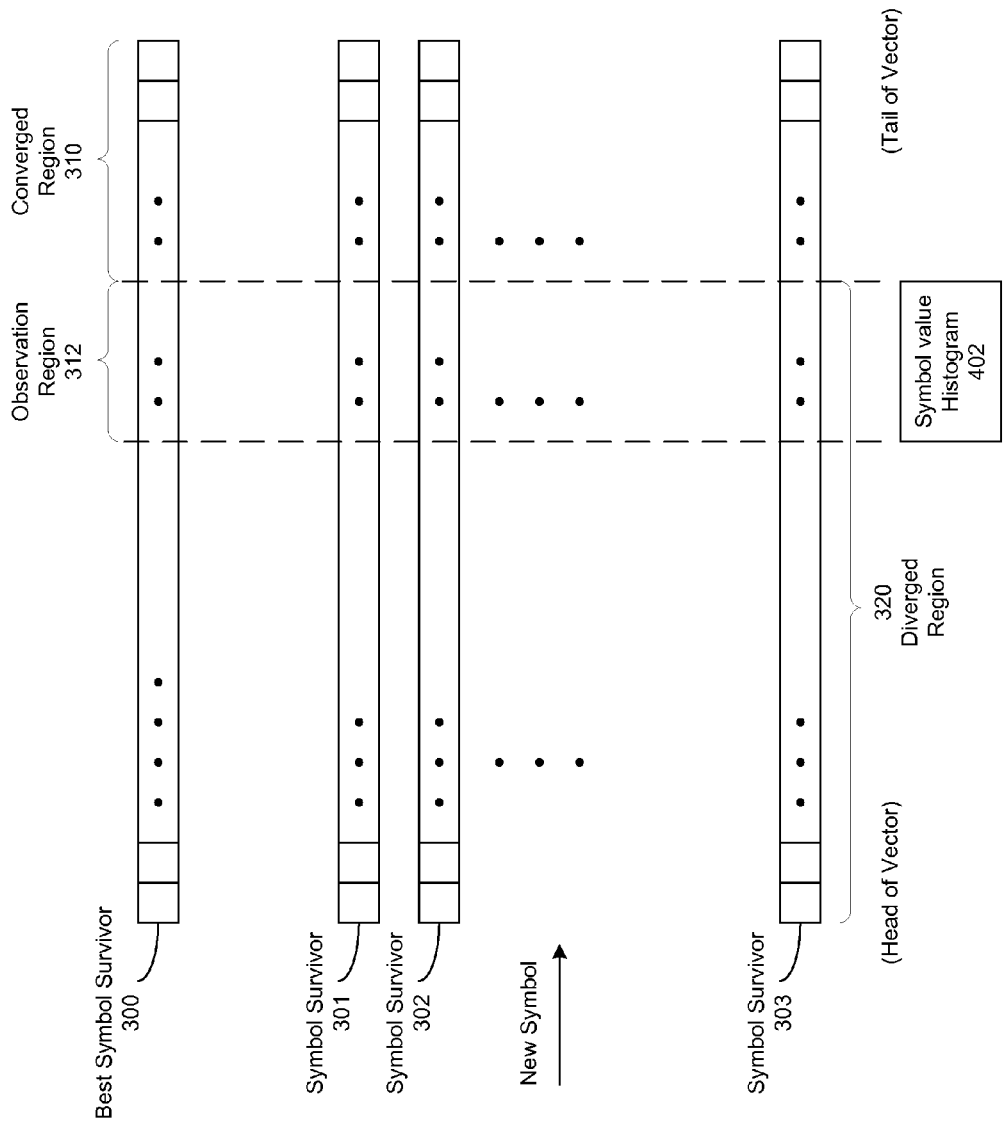

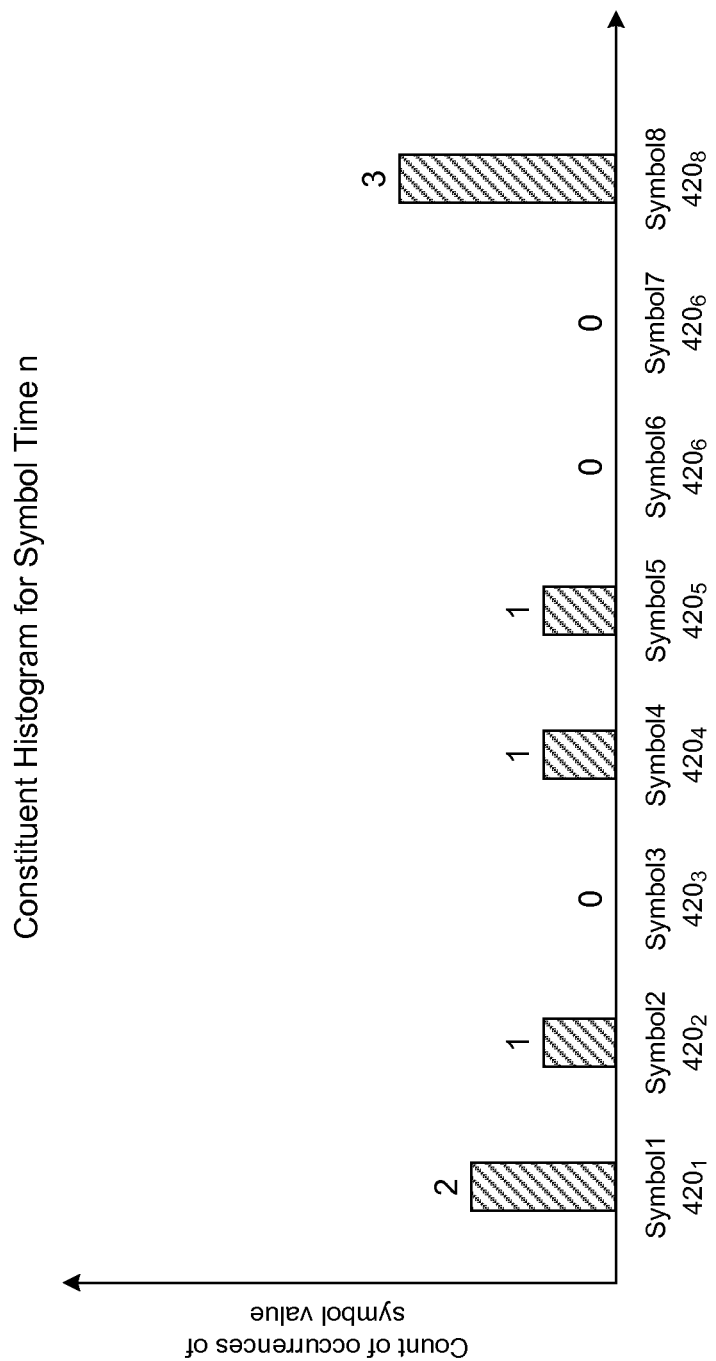

REDUCED STATE SEQUENCE ESTIMATION WITH SOFT DECISION OUTPUTS

CROSS-REFERENCE TO RELATED APPLICATIONS/INCORPORATION BY REFERENCE

This patent application is a continuation of U.S. patent application Ser. No. 13/922,329 filed Jun. 20, 2013, now U.S. Pat. No. 8,666,000, which makes reference to, claims priority to, and claims benefit from:

U.S. Provisional Patent Application Ser. No. 61/662,085 entitled "Apparatus and Method for Efficient Utilization of Bandwidth" and filed on Jun. 20, 2012, now expired;

U.S. Provisional Patent Application Ser. No. 61/726,099 entitled "Modulation Scheme Based on Partial Response" and filed on Nov. 14, 2012, now expired;

U.S. Provisional Patent Application Ser. No. 61/729,774 entitled "Modulation Scheme Based on Partial Response" and filed on Nov. 26, 2012, now expired;

U.S. Provisional Patent Application Ser. No. 61/747,132 entitled "Modulation Scheme Based on Partial Response" and filed on Dec. 28, 2012, now expired;

U.S. Provisional Patent Application Ser. No. 61/768,532 entitled "High Spectral Efficiency over Non-Linear, AWGN Channels" and filed on Feb. 24, 2013; and U.S. Provisional Patent Application Ser. No. 61/807,813 entitled "High Spectral Efficiency over Non-Linear, AWGN Channels" and filed on Apr. 3, 2013.

Each of the above applications is hereby incorporated herein by reference in its entirety.

This application also makes reference to:

U.S Pat. No. 8,582,637, titled "Low-Complexity, Highly-Spectrally-Efficient Communications";

U.S patent application Ser. No. 13/754,998, titled "Design and Optimization of Partial Response Pulse Shape Filter," and filed on Jan. 31, 2013;

U.S Pat. No. 8,675,769 titled "Constellation Map Optimization for Highly Spectrally Efficient Communications," and filed on Jan. 31, 2013;

U.S Pat. No. 8,571,131, titled "Dynamic Filter Adjustment for Highly-Spectrally-Efficient Communications";

U.S Pat. No. 8,559,494, titled "Timing Synchronization for Reception of Highly-Spectrally-Efficient Communications";

U.S Pat. No. 8,559,496, titled "Signal Reception Using Non-Linearity-Compensated, Partial Response Feedback";

U.S Pat. No. 8,599,914, titled "Feed Forward Equalization for Highly-Spectrally-Efficient Communications";

U.S Pat. No. 8,665,941, titled "Decision Feedback Equalizer for Highly Spectrally Efficient Communications";

U.S patent application Ser. No. 13/755,025, titled "Decision Feedback Equalizer with Multiple Cores for Highly-Spectrally-Efficient Communications," and filed on Jan. 31, 2013;

U.S Pat. No. 8,559,498, titled "Decision Feedback Equalizer Utilizing Symbol Error Rate Biased Adaptation Function for Highly Spectrally Efficient Communications";

U.S Pat. No. 8,548,097, titled "Coarse Phase Estimation For Highly-Spectrally-Efficient Communications";

U.S Pat. No. 8,565,363, titled "Fine Phase Estimation for Highly Spectrally Efficient Communications";

U.S Pat. No. 8,744,003 titled "Multi-Mode Transmitter for Highly-Spectrally-Efficient Communications," and filed on Jan. 31, 2013;

U.S Pat. No. 8,605,832, titled "Joint Sequence Estimation of Symbol and Phase With High Tolerance Of Nonlinearity";

U.S Pat. No. 8,553,821, titled "Adaptive Non-Linear Model for Highly-Spectrally-Efficient Communications";

U.S Pat. No. 8,824,599 titled "Pilot Symbol-Aided Sequence Estimation for Highly-Spectrally-Efficient Communications," and filed on Jan. 31, 2013;

U.S Pat. No. 8,571,146, titled "Method and System for Corrupt Symbol Handling for Providing High Reliability Sequences";

U.S Pat. No. 8,566,687, titled "Method and System for Forward Error Correction Decoding with Parity Check for Use in Low Complexity Highly-spectrally-efficient Communications";

U.S patent application Ser. No. 13/755,061, titled "Method and System for Quality of Service (QoS) Awareness in a Single Channel Communication System," and filed on Jan. 31, 2013;

U.S Pat. No. 8,665,992, titled "Pilot Symbol Generation for Highly-Spectrally-Efficient Communications";

U.S Pat. No. 8,548,072, titled "Timing Pilot Generation for Highly-Spectrally-Efficient Communications";

U.S Pat. No. 8,842,778 titled "Multi-Mode Receiver for Highly-Spectrally-Efficient Communications," and filed on Jan. 31, 2013;

U.S Pat. No. 8,572,458, titled "Forward Error Correction with Parity Check Encoding for use in Low Complexity Highly-spectrally-efficient Communications"; and U.S Pat. No. 8,526,523, titled "Highly-Spectrally-Efficient Receiver".

Each of the above applications is hereby incorporated herein by reference in its entirety.

FIELD

Certain embodiments of the disclosure relate to communication systems. More specifically, certain embodiments of the disclosure relate to a method and system for improving bit error rate (BER) performance based on a sequence estimation algorithm and forward error correction (FEC).

BACKGROUND

Existing communications methods and systems are overly power hungry and/or spectrally inefficient. Complex linear modulation schemes such as, for example, quadrature amplitude modulation (QAM), are used vastly in wireless and non-wireless communications. However, performance of such modulation schemes degrades in the presence of phase noise and non-linear distortion associated with the communication channel. Some of these modulation schemes may perform, for example, 4-5 dB below the Shannon capacity bound in the case of severe phase noise. As higher-order modulation is needed to drive more throughput, the result may be a throughput that is even further away from the Shannon capacity limit. That is, the gap between maximum spectral efficiency and actual spectral efficiency may actually increase with increasing QAM order. In addition, higher-order modulation may also be increasingly sensitive to non-linear distortion.

Further limitations and disadvantages of conventional and traditional approaches will become apparent to one of skill in the art, through comparison of such systems with the present disclosure as set forth in the remainder of the present application with reference to the drawings.

BRIEF SUMMARY OF THE DISCLOSURE

Aspects of the present disclosure are directed to a method and system for improving bit error rate (BER) performance based on a sequence estimation algorithm and forward error correction (FEC), substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF DRAWINGS

FIG. 3 is a diagram illustrating example symbol survivors, in accordance with an embodiment of the disclosure.

FIGS. 4A-4F illustrate generation of example histograms from symbol survivors in a RSSE circuit, in accordance with an embodiment of the disclosure.

DETAILED DESCRIPTION

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, a device/module/circuitry/etc. is "operable" to perform a function whenever the device/module/circuitry/etc. comprises the necessary hardware and code (if any is necessary) to perform the function, regardless of whether performance of the function is disabled, or not enabled, by some user-configurable setting.

Figure 1:
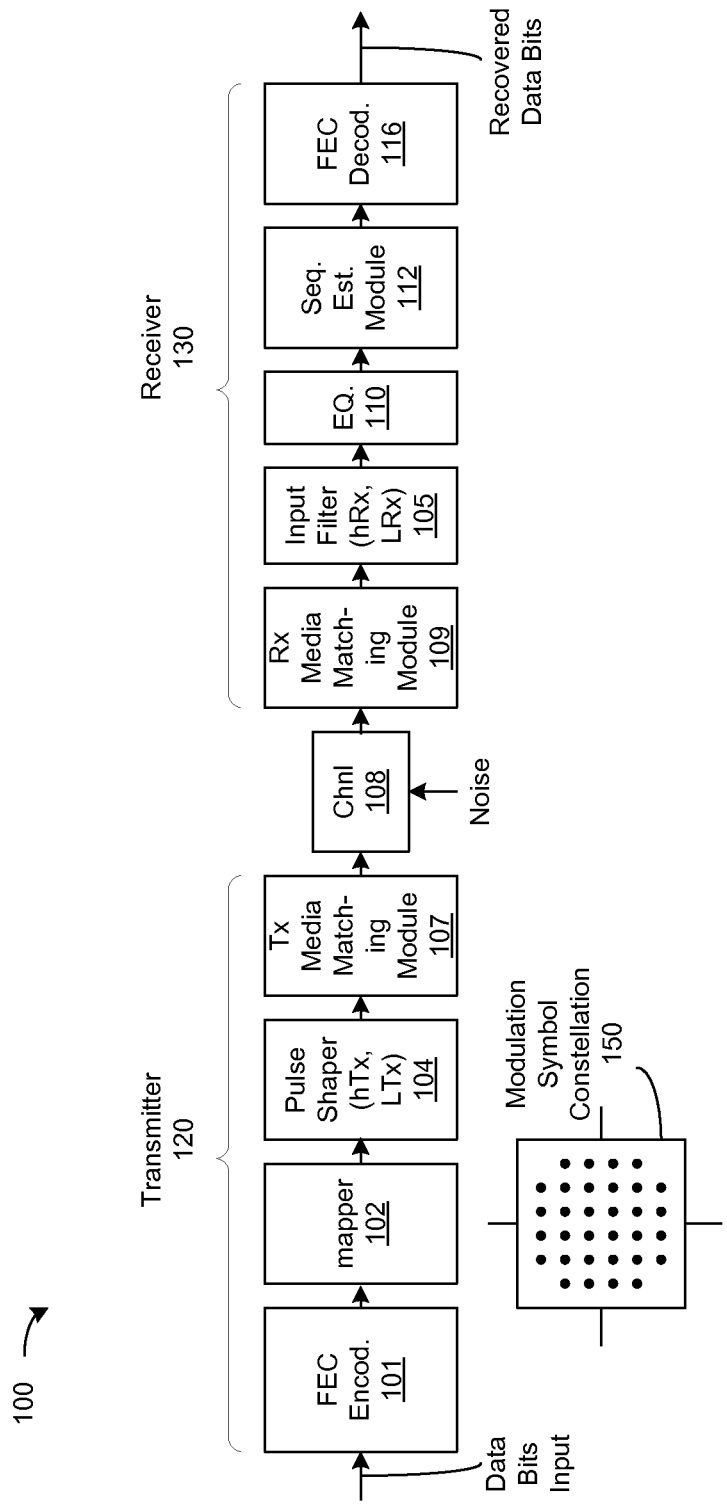
FIG. 1 is a block diagram illustrating an example communication system, in accordance with an embodiment of the disclosure.

FIG. 1 is a block diagram illustrating an example communication system, in accordance with an embodiment of the disclosure. Referring to FIG. 1, there is shown a communication system 100. The communication system 100 may comprise a transmitter 120, a communication channel 108 and a receiver 130. The transmitter 120 may comprise, for example, a FEC encoder 101 and a word-to-symbol module 102. The receiver 130 may comprise, for example, a sequence estimation module 112, a symbol-to-word module 114 and a FEC decoder 116. A total partial response filtering function may be split between the transmitter 120 and the receiver 130. In this regard, the transmitter 120 may comprise a pulse shaper 104 and the receiver 130 may comprise an input filter 105. The total partial response filtering function may be split between the pulse shaper 104 and the input filter 105. In an example embodiment of the disclosure, other components such as, for example, an interleaver in the transmitter 120, a timing recovery module in the receiver 130, and/or a de-interleaver in the receiver 130 may also be optionally included without departing from the spirit and scope of various embodiments of the disclosure.

The FEC encoder 101 may comprise suitable logic, circuitry, interfaces and/or code that may be operable to generate codewords from the input data bitstream. Each codeword may comprise one or more information subwords and one or more parity subwords to enable error correction in the receiver 130. Each subword may be a bit or may be a symbol. The FEC codewords may be generated, for example, in accordance with a Reed-Solomon (RS) code. Forward error correction (FEC) may be used to fix communication errors caused by a communication channel such as the channel 108. Using a good and suitable FEC may improve spectral efficiency of the system 100 and enable it to perform close to the Shannon capacity bound. However, using FEC may introduce overhead, the amount of which depends on the FEC code rate.

The mapper module 102 may comprise suitable logic, circuitry, interfaces and/or code that may be operable to map codewords to symbols according to, for example, a linear modulation scheme such as a quadrature amplitude modulation (QAM). In this regard, an M-QAM may comprise a total of M symbols in a QAM symbol constellation over an I-Q plane (M is a positive integer). For example, a 32-QAM symbol constellation may comprise a total of 32 symbols. A modulation symbol constellation 150 is also illustrated in FIG. 1. In an example implementation, each FEC codeword output by encoder 101 may comprise S subwords, each subword may comprise L bits, and every $\log_2(M)/L$ of the S subwords may be mapped to a constellation symbol by module 102.

Although M-QAM is used for illustration in this disclosure, aspects of this disclosure are applicable to any modulation scheme (e.g., amplitude shift keying (ASK), phase shift keying (PSK), frequency shift keying (FSK), etc.). Additionally, points of the M-QAM constellation may be regularly spaced ("on-grid") or irregularly spaced ("off-grid").

The pulse shaper 104 may comprise suitable logic, circuitry, interfaces and/or code that may be operable to adjust the waveform of a signal received from the mapper module 102 such that the waveform of a resulting signal complies with the spectral requirements of a communication channel such as the channel 108. The spectral requirements may be referred to as the "spectral mask" and may be established by a regulatory body (e.g., the Federal Communications Commission in the United States or the European Telecommunications Standards Institute) and/or a standard body (e.g., Third Generation Partnership Project) that governs the communication channels and/or standards in use.

The input filter 105 may comprise suitable logic, circuitry, interfaces and/or code that may be operable to adjust the waveform of the signal received via the channel 108 to generate a signal for further processing in the receiver 130.

Each of the pulse shaper 104 and the input filter 105 may comprise, for example, an infinite impulse response (IIR) and/or a finite impulse response (FIR) filter. The number of taps in the pulse shaper 104 is designated LTx and the number of taps in the input filter 105 is designated LRx. The impulse response of the pulse shaper 104 is denoted herein as hTx and the impulse response of the input filter 105 is denoted herein as hTRx.

In an example embodiment of the disclosure, in order to improve tolerance of non-linearity, the pulse shaper 104 and the input filter 105 may be configured such that each of the output signal of the pulse shaper 104 and the output signal of the input filter 105 intentionally has a substantial amount of inter-symbol interference (ISI). In this regard, the ISI is therefore a controlled ISI. Accordingly, the pulse shaper 104 may be referred to as a partial response pulse shaping filter, and the resulting (output) signals of the pulse shaper 104 and the input filter 105 may be referred to as partial response signals or as residing in the partial response domain. The number of the taps and/or the values of the tap coefficients of the input filter 105 may be designed such that it is intentionally non-optimal in terms of noise in order to improve the tolerance of non-linearity. In this regard, the pulse shaper 104 and/or the input filter 105 in the system 100 may offer superior performance in the presence of non-linearity as compared to, for example, a conventional near zero positive ISI pulse shaping filter such as a raised cosine (RC) pulse shaping filter or a pair of root-raised cosine (RRC) pulse shaping filters.

It should be noted that a partial response signal (or signals in the "partial response domain") is just one example of a type of signal for which there is correlation among symbols of the signal (referred to herein as "inter-symbol-correlated (ISC) signals"). Such ISC signals are in contrast to zero (or near-zero) ISI signals generated by, for example, raised-cosine (RC). For simplicity of illustration, this disclosure focuses on partial response signals generated via partial response filtering. Nevertheless, aspects of this disclosure are applicable to other ISC signals such as, for example, signals generated via matrix multiplication (e.g., lattice coding), and signals generated via decimation as in multi carrier applications such as in OFDM systems.

A "total partial response (h)" may be equal to the convolution of hTx and hRx, and, thus, the "total partial response length (L)" may be equal to LTx+LRx−1. L may, however, be chosen to be less than LTx+LRx−1 where, for example, one or more taps of the pulse shaper 104 and/or the input filter 105 are below a determined level. Reducing L may reduce decoding complexity of a sequence estimation process in the receiver 130. This tradeoff may be optimized during the design of the pulse shaper 104 and the input filter 105 in the system 100.

The Tx media matching module 107 may comprise suitable logic, circuitry, interfaces and/or code that may be operable to transform the partial response signal outputted by the pulse shaper 104 to an appropriate signal needed to drive the media in the channel 108. For example, the Tx media matching module 107 may comprise a power amplifier, a radio frequency (RF) up-converter, an optical transceiver for optical application, and/or other transformation device which may be required for propagating over the media.

The Rx media matching module 109 may comprise suitable logic, circuitry, interfaces and/or code that may be operable to convert the signal coming from the media in the channel 108 to baseband signal for processing or demodulating. For example, the Rx media matching module 109 may comprise a power amplifier, a radio frequency (RF) down-converter, an optical transceiver for optical application, and/or or other transformation device.

The channel 108 may comprise suitable logic, circuitry, device, interfaces and/or code that may be operable to transmit signals from the transmitter 120 to the receiver 130. The channel 108 may comprise a wired, wireless and/or optical communication medium. The channel 108 may comprise noise such as, for example, additive white Gaussian noise (AWGN). The channel 108 may also introduce distortions such as multipath and fading. In an example embodiment of the disclosure, signals transmitted over the channel 108 may include distortion such as, for example, phase noise and/or non-linear distortion. In this regard, for example, the channel 108 may receive signals from the transmitter 120 via a Tx media matching module 107 which transforms the partial response signal outputted by the pulse shaper 104 to an appropriate signal needed to drive the media in the channel 108. The receiver 130 may receive signals from the channel 108 via an Rx media matching module 109 which converts the signal coming from the media to baseband for demodulating. Both the Tx media matching module 107 and the Rx media matching module 109 may introduce distortion such as phase noise and non-linear distortion (and/or other non-idealities) caused by, for example, limited dynamic range of components. For example, in radio applications, frequency sources may be needed for up-converting the partial response signal outputted by the pulse shaper 104 from baseband to radio frequency (RF). The frequency sources may introduce phase noise which may distort the phase of the modulated signal. Non-linear distortion (e.g., $3^{rd}$ order) may be generated by elements such as, for example, mixers, power amplifiers, variable attenuators and/or baseband analog amplifiers.

The equalizer 110 may comprise suitable logic, circuitry, interfaces and/or code that may be operable to perform equalization functions for the receiver 130. The equalizer 110 may be operable to process a signal received by the equalizer 110 to reduce, for example, ISI caused by the channel 108 between the transmitter 120 and the receiver 130. In an example embodiment of this disclosure, the input signal of the equalizer 110 may be a partial response signal received via the channel 108. In this regard, the output signal of the equalizer 110 may be a partial response signal where the ISI left in the output signal may be primarily the result of the pulse shaper 104 and/or the input filter 105 (there may be some residual ISI from multipath, for example, due to use of a least-mean-square (LMS) approach in the equalizer 110). In an example embodiment of the disclosure, the equalizer 110 may be adapted based on an error signal that may be generated in reference to a reconstructed signal (e.g., a reconstructed partial response signal) generated by the sequence estimation module 112.

The sequence estimation module 112 may comprise suitable logic, circuitry, interfaces and/or code that may be operable to perform sequence estimation functions for the receiver 130. The sequence estimation module 112 may be operable to output soft-decisions, hard-decisions, or both. The soft-decisions may be calculated as log-likelihood ratios (LLRs). For a binary code, this ratio is defined as the log of the ratio of the (a posteriori) probabilities that a transmitted bit, $d_k$, was a "1" or "0", respectively (or vice versa), based on the received version of that bit, $y_k$.

$$\Lambda(d_k) = \log \frac{P(d_k = \text{``1''} \mid y_k)}{P(d_k = \text{``0''} \mid y_k)}. \tag{1}$$

For an M-ary code, each code symbol may be assigned (M−1) soft values defined as the log of the ratio of the probability of that symbol being one of the values of the alphabet et and the probability that this symbol was transmitted as the arbitrarily chosen predefined symbol reference denoted by $S_0$:

$$\Lambda(d_k = S_j) = \log \frac{P(d_k = S_j \mid y_k)}{P(d_k = S_0 \mid y_k)}, \tag{2}$$

$$j = 1, 2, \ldots, M-1.$$

Iterative decoding techniques employ soft-decision decoding algorithms that also provide soft-decision output. The traditional Viterbi algorithm is a soft-decision decoding algorithm that does not calculate soft-decision output. A modified version of this algorithm, the so-called Soft-Output Viterbi Algorithm (SOVA) produces that soft output. This algorithm maintains a symbol survivor per each code (trellis) state (similarly to the traditional Viterbi algorithm) in addition to an LLR (soft decision) per each bit (in some range with respect to the present symbol time) and code state. This soft decision quantifies the reliability of that bit, provided that the final decision is in favor of the respective code state. This soft decision may be defined as the log of the probability of the best trellis path that ends in the code state under discussion and the probability of a second path that terminates in this state. This second path is the best path that terminates in this same state in which the bit under discussion takes on the opposite value relative to its value on the best path that ends in the state under discussion. In general, at each symbol time (trellis branch) or once per a few symbol times, the soft-decision decoding algorithm decides on the best trellis state and traces back the maintained information to a given decision delay and it routes out the soft-values associated with the winner trellis state at that trace-back depth. Clearly, tracing back the surviving paths, they tend to coincide into the same history path for a sufficiently large decoding delay (relative to the most recent symbol). Thus, when the soft-values (or also hard decisions) are read off with some sufficient delay, they are assumed to be reliable.

In implementations in which the sequence estimation module 112 maintains full state information (e.g., the information required for optimum maximum-likelihood sequence estimation), an algorithm such as SOVA may be used for generating soft symbol estimates. In practice, however, the complexity of such an implementation would rapidly become unwieldy as the size of the symbol constellation increases.

In implementations in which the sequence estimation module 112 uses a reduced-state sequence estimation algorithm, full state information is not available and, consequently, algorithms such as SOVA are inapplicable. Accordingly, in such implementations, information about symbol survivors may be used to generate soft decisions. In one implementation, soft decisions may be generated per-subword of an FEC codeword. In one such implementation, the soft decisions (e.g., formatted as LLRs) may not be associated with individual survivor paths or states. Instead, a single soft-decision for a subword may be generated based on a plurality of survivors. For example, the soft-values may be derived from a symbol histogram generated for the respective trellis branch. Per a transmitted constellation symbol or trellis branch, a symbol histogram is generated and retained over multiple iterations of the sequence estimation process. This histogram relates some measure, or probability, for interpreting the received symbol, at that symbol time, as one of the possible constellation symbols or FEC symbols. Thus the length of this histogram may be M, where M is the size of the symbol constellation used for modulation. Example histograms are described below with reference to FIGS. 4A and 4B.

The FEC decoder 116 may comprise suitable logic, circuitry, interfaces and/or code that may be operable to utilize the parity subwords of the FEC codewords to correct errors. For example, the FEC decoder 116 may be a Reed-Solomon (RS) decoder, Low Density Parity Check (LDPC) code, a so called Turbo Code scheme (such as a Parallel Concatenated Code—PCC), or a concatenated coding scheme that includes an inner code scheme in addition to another outer code.

Figure 2A:
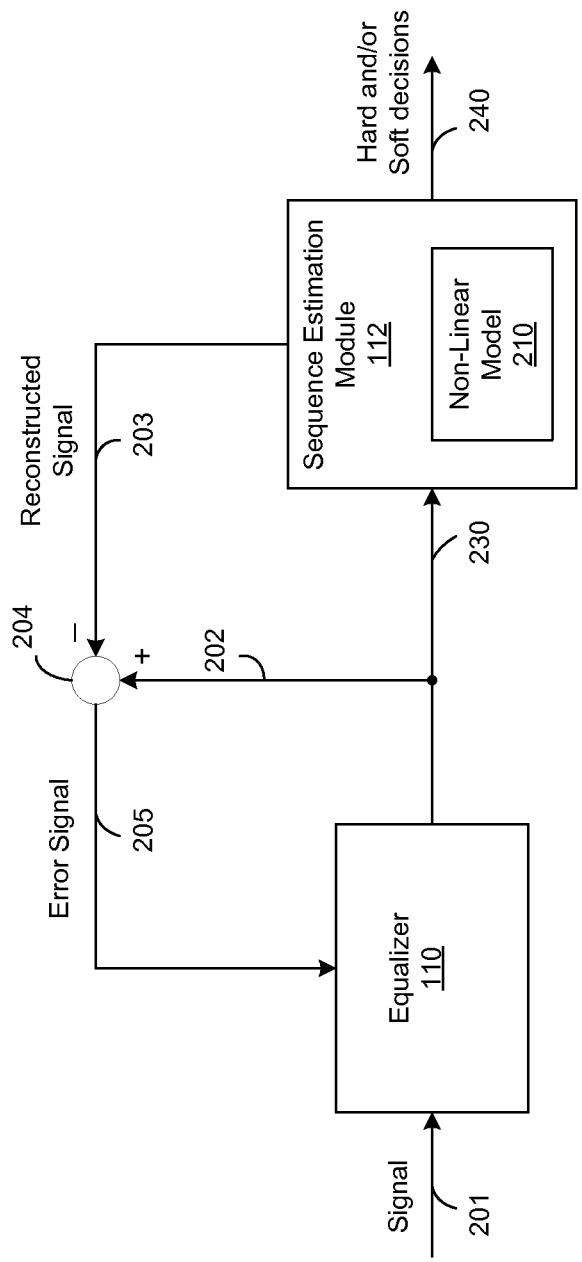
FIG. 2A is a block diagram illustrating an example coupling of an equalizer and a sequence estimation module in a receiver, in accordance with an embodiment of the disclosure.

FIG. 2A is a block diagram illustrating an example coupling of an equalizer and a sequence estimation module in a receiver, in accordance with an embodiment of the disclosure. Referring to FIG. 2A, there is shown the equalizer 110 and the sequence estimation module 112. The sequence estimation module 112 may incorporate a non-linear model 210 in a sequence estimation process. The equalizer 110 and the sequence estimation module 112 may be as described with respect to FIG. 1, for example.

In the exemplary embodiment of the disclosure illustrated in FIG. 2A, although the equalizer 110 and the sequence estimation module 112 are shown, the disclosure may not be so limited. Other modules (or circuits) such as, for example, a carrier recovery module, a phase adjust module and/or other similar modules may also be optionally included in FIG. 2A without departing from the spirit and scope of various embodiments of the disclosure. For example, the carrier recovery module and/or the phase adjust module may be included for various phase correction or recovery throughout the equalization process and/or the sequence estimation process.

The non-linear model 210 may comprise, for example, a saturated third order polynomial which may be expressed as $$y = \begin{cases} x \cdot (1 - r \cdot e^{j\varphi} \cdot |x|^2), & x < x_{sat} \\ y_{sat}, & x \geq x_{sat} \end{cases} \quad [1]$$

$$y_{sat} = x_{sat} \cdot (1 - r \cdot e^{j\varphi} \cdot |x_{sat}|^2)$$

where, $x_{sat}$ denotes the input saturation value, $y_{sat}$ denotes the output saturation value, x denotes an input of a non-linear device (or group of devices), y denotes an output of the non-linear device (or group of devices), and γ may be set according to a desired distortion level (backoff). For example, the non-linear device may be a power amplifier in the Tx media matching module 107. In this regard, the x in equation [1] may denote an input power level of the power amplifier and the y may denote an output power level of the power amplifier. Increased accuracy resulting from the use of a higher-order polynomial for the non-linear model 210 may tradeoff with increased complexity of implementing a higher-order polynomial. As transmitter's non-linearity may be the dominant non-linearity of the communication system 100, modeling the transmitter's non-linearity may be sufficient. In instances where degradation in a receiver's performance is above a certain threshold due to other non-linearities in the system (e.g., non-linearity of the Rx media matching module 109), the non-linear model 210 may take into account such other non-linearities. Equation 1 represents just one example of a non-linearity model that may be used by the module 112 in one or more embodiments of the disclosure.

In an example operation, the equalizer 110 may be operable to process or equalize a signal 201 to reduce, for example, ISI caused by the channel 108. The equalizer adaptation may be based on, for example, a LMS algorithm. An error signal 205 is fed back to the equalizer 110 to drive the adaptive equalizer 110. The reference for generating the error signal 205 may be, for example, a reconstructed signal 203 coming from the sequence estimation module 112. In an example embodiment of the disclosure, the signal 201 may be a partial response signal. In this regard, the reconstructed signal 203 may be a reconstructed partial response signal. The error signal 205 is the difference, calculated by a combiner 204, between an output signal 202 of the equalizer 110 and the reconstructed signal 203. Generation of the reconstructed signal 203 may incorporate the non-linear model 210 of the signal 201 and is described below with reference to FIG. 2B. An equalized signal 230 may be inputted to the sequence estimation module 112. The sequence estimation module 112 may be operable to generate symbols (estimated symbols) 240, from the signal 230, using the sequence estimation process. The generated symbols 240 may be hard and/or soft estimates of transmitted symbols generated by the mapper module 102 in the transmitter 120. An example implementation of the sequence estimation module 112 is described below with reference to FIG. 2B.

Figure 2B:
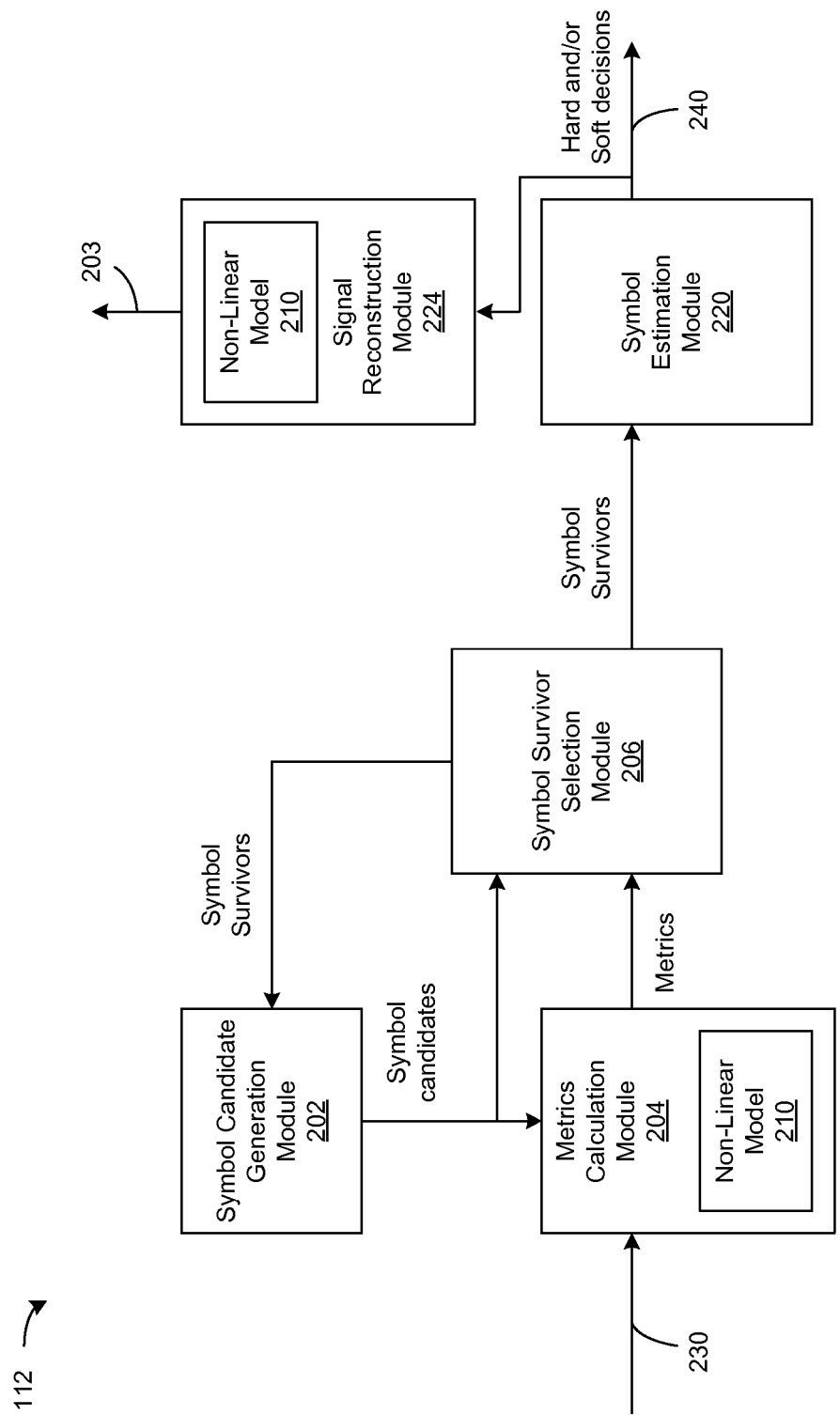
FIG. 2B is a block diagram illustrating an example sequence estimation module in a receiver, in accordance with an embodiment of the disclosure.

FIG. 2B is a block diagram illustrating an example sequence estimation module in a receiver, in accordance with an embodiment of the disclosure. Referring to FIG. 2B, there is shown the sequence estimation module 112. The sequence estimation module 112 may comprise, for example, a symbol candidate generation module 202, a metrics calculation module 204, a symbol survivor selection module 206, a symbol estimation module 220 and a signal reconstruction module 224. The sequence estimation process described with respect to FIG. 2B is an example only. Many variations of the sequence estimation process may also be possible. The sequence estimation module 112 may be as described with respect to FIGS. 1 and 2A, for example.

The metrics calculation module 204 may comprise suitable logic, circuitry, interfaces and/or code that may be operable to generate metrics needed for symbol survivor selections and symbol (including corresponding phase) estimations. Metrics calculations may be executed based on a signal 230 received by the metrics calculation module 204 and symbol candidates generated by the symbol generation module 202. Each symbol candidate may be a vector comprising, for example, Q candidate symbols (Q is a positive integer). Information associated with the taps of the pulse shaper 104 and/or the input filter 105 may also be utilized for the metrics calculation. In an example embodiment of the disclosure, the signal 230 may be a partial response signal received from the input filter 105. The taps information (e.g., number of taps and/or tap coefficients) associated with the pulse shaper 104 and/or the input filter 105 may be used to generate reconstructed partial response signal candidates from the symbol candidates, for example, via convolution. The taps information associated with the pulse shaper 104 and/or the input filter 105 may be presented, for example, in the form of (LTx+LRx−1) tap coefficients corresponding to the total partial response h, according to the LTx tap coefficients of the pulse shaper 104 and the LRx tap coefficients of the input filter 105. Furthermore the non-linear model 210 may be incorporated in the process of generating the reconstructed partial response signal candidates. For example, the non-linear model 210 may be applied to the convolved symbol candidates to generate the reconstructed partial response signal candidates. The metric value for each of the symbol candidates may then be generated based on a cost function (e.g., a squared error function) between the signal 230 and the reconstructed partial response signal candidates. One or more candidates which have the best metrics level may be selected by the symbol survivor selection module 206 for the next iteration of the sequence estimation process.

The symbol survivor selection module 206 may comprise suitable logic, circuitry, interfaces and/or code that may be operable to perform metrics sorting and selection of a determined number of symbol survivors based on the metrics associated with the symbol candidates. In this regard, for example, one or more candidates which have the lowest metrics level may be selected, from among the symbol candidates, as symbol survivors. Where the module 112 implements a reduced state sequence estimation (RSSE) algorithm, the number of survivors selected by the module 206 for the next iteration may be smaller than the size of the corresponding Maximum Likelihood state space. For example, for M-QAM and total partial response length L, the number of survivors selected for the next iteration may be less than $M^{(L-1)}$. Each symbol survivor may also be a vector comprising, for example, Q candidate symbols (Q is a positive integer). Each element of each symbol survivor may comprise a soft-decision estimate and/or a hard-decision estimate of a symbol of the signal 230. Besides a newly-detected symbol at a head of the vector, there are (Q−1) symbols in the vector. Some of the (Q−1) symbols could be different than corresponding symbols in a previously-selected symbol survivor (i.e. the sequence estimation may diverge to a different vector). The reliability of the newly-detected symbol may be very low because it may be derived only from the newest signal sample and a first tap of the (LTx+LRx−1) taps associated with the pulse shaper 104 and/or the input filter 105, which may have a coefficient that is small in magnitude. The reliability of old symbols toward a tail of the vector may improve along the survived vectors because old symbols are represented by many signal samples (up to effective number of the taps of the total partial response) and thus take advantage of more information. In this regard, the tails (old symbols) of the symbol survivors may converge to the same solution while the head (young symbols) parts of the symbol survivors may be different.

The symbol candidate generation module 202 may comprise suitable logic, circuitry, interfaces and/or code that may be operable to generate symbol candidates from symbol survivors generated from a previous iteration of the sequence estimation process. For example, for M-OAM (M is a positive integer), there are M symbols in the M-QAM symbol constellation (e.g., the modulation symbol constellation 150) over an I-Q plane. In this regard, generation of the symbol candidates may comprise, for example, duplicating (e.g., (M−1) times) each of the symbol survivors (vectors) generated during the previous iteration of the sequence estimation process, shifting each of the resulting M vectors by one symbol position toward the tail of the vector, and then filling each of the M vacant symbol positions (at the head of the vector) with a symbol from among the M possible symbols in the M-QAM symbol constellation (e.g., the modulation symbol constellation 150).

The symbol estimation module 220 may comprise suitable logic, circuitry, interfaces and/or code that may be operable to generate hard and/or soft decisions based on the symbol survivors received from the symbol survivor selection module 206. The symbol estimation module 220 may comprise one or more buffers to store one or more symbol survivors. In an example implementation, a hard decision output by module 220 may be a symbol determined to be the most-likely transmitted symbol corresponding to a sample of signal 230. In an example implementation, a hard decision output by module 220 may be a subword determined to be the most-likely transmitted subword corresponding to a sample of signal 230. In an example implementation, a soft decision output by module 220 may comprise a plurality of LLRs indicating, for a sample of the signal 230, the respective probabilities of each of a plurality of possible subword values of a FEC codeword.

Operation of an example symbol estimation module 220 is described below with reference to FIG. 3.

The signal reconstruction module 224 may comprise suitable logic, circuitry, interfaces and/or code that may be operable to generate the reconstructed signal 203. In an example embodiment of the disclosure, the signal 230 may be an equalized partial response signal received from the equalizer 110. The taps information associated with the pulse shaper 104 and/or the input filter 105 (e.g., the (LTx+LRx−1) tap coefficients) may be used to generate the reconstructed signal (partial response signal) 203 from the estimated symbols 240, for example, via convolution. In this regard, for example, the non-linear model 210 may be incorporated in the process of generating the reconstructed signal (partial response signal)

203. For example, the non-linear model 210 may be applied to the convolved symbols to generate the reconstructed signal (partial response signal) 203.

FIG. 3 is a diagram illustrating example symbol survivors, in accordance with an embodiment of the disclosure. Referring to FIG. 3, there is shown a best symbol survivor 300 and a plurality of other symbol survivors, of which symbol survivors 301-303 are illustrated. Each of the symbol survivors 300-303 may comprise a vector of estimated symbol values, the values selected from among the values of a symbol constellation (such as the modulation symbol constellation 150) used in generating the signal being decoded. The length of the vector may be determined or designed, for example, based on the total partial response length L (e.g., L=LTx+RTx−1). For example, the length of the vector may be five times the length of the total partial response length L. For M-QAM (M is a positive integer), there are a total of M possible symbol values in the M-QAM constellation over an I-Q plane. For example, for a 32-QAM, there are a total of 32 symbol values in the 32-QAM symbol constellation.

There is also shown in FIG. 3, a converged region 310 toward a tail of the vector, a diverged region 320 toward a head of the vector and an observation region 312 which is within the diverged region 320 yet adjacent to the converged region 310. For each iteration of the sequence estimation process performed by the sequence estimation module 112, a left-most element of each of the symbol survivors 300-303 holds an estimated symbol value for symbol time n, a second element holds an estimated symbol value for symbol time n−1, and so on. Thus, as time progresses, estimated symbol values for particular points in time will shift to the right in the symbol survivors. In other words, "older" estimated symbol values (i.e., value with longer decision delay) are to the right in FIG. 3 and "newer" estimated symbol values (i.e., values with shorter decision delay) are to the left in FIG. 3. Because older estimated symbol values are based on more information (e.g., based on more filter taps) the older estimated symbol values will tend to be the same across the various symbol survivors 300-303 (i.e., the estimated symbol values converge toward the tail of the symbol survivors—hence the "converged" region 310). The converged estimated symbol values will tend to be more accurate/reliable since they are based on more information.

There is also shown in FIG. 3 a symbol value histogram 402 (which may be similar to one or more of the histograms shown in FIGS. 4A-4E) which may be computed based on estimated symbol values within the observation region 312 of the symbol survivors 300-303. Soft decisions 240 may be generated based on a computed symbol value histogram 402.

The location of the observation region 312 may be determined (and a corresponding parameter set) based on a trade-off between the diversity provided by the diverged region 320 and the reliability provided by the converged region 310. That is, the location of the observation region 312 may be selected such that the symbol values for the various symbol survivors 300-303 are sufficiently different to provide greater than zero count for more than one symbol value, yet provide sufficiently reliable symbol estimations. The observation region 312 may be a less-diverged sub-region within the diverged region 320 as compared to other (further to the left, in FIG. 3) sub-regions within the diverged region 320.

The depth of the observation region 312 may be determined (and a corresponding parameter set) based on, for example, variability in location of the symbol survivors at which a determined percentage (e.g., 90%) of the symbol survivors converge to the same estimated value for a particular symbol. If, for example, the depth of the observation region 312 is set to one, but located at a position where the estimated values of a particular symbol have already converged, then the histogram 402 will have zero counts for all but one possible symbol value. If, on the other hand, the depth of the observation region 312 is set to one, but the location is at a position where the estimates of a particular symbol are widely divergent, then the histogram 402 may equal counts for multiple possible symbol values. By setting the depth of the observation region 312 to greater than one, some averaging is achieved whereby, even if the estimated values of a particular symbol corresponding to a group of subwords were widely diverged at the front of the observation region 312, and fully converged by the time they reached the tail of the observation region 312 (x iterations of the sequence estimation process later, for a depth of x symbols), the averaging effect may still result in a histogram that provides useful information as to the probabilities of the various possible values for the transmitted constellation symbols.

FIGS. 4A-4E illustrate generation of example histograms from symbol survivors in an RSSE circuit, in accordance with an embodiment of the disclosure. While FIGS. 4A-4F use an 8-QAM symbol constellation and maintenance of 8 survivors during the RSSE process (hence the total count in each of FIGS. 4A and 4B sums to 8) for purposes of illustration, any symbol constellation may be used and any number of survivors may be maintained. In this regard, the number of survivors maintained need not be equal to the number of points in the constellation. For example, decoding circuit 116 may decode a signal generated with an M-QAM constellation by storing N survivors per symbol time, where N may be greater than, equal to, or less than M.

Figure 4B:
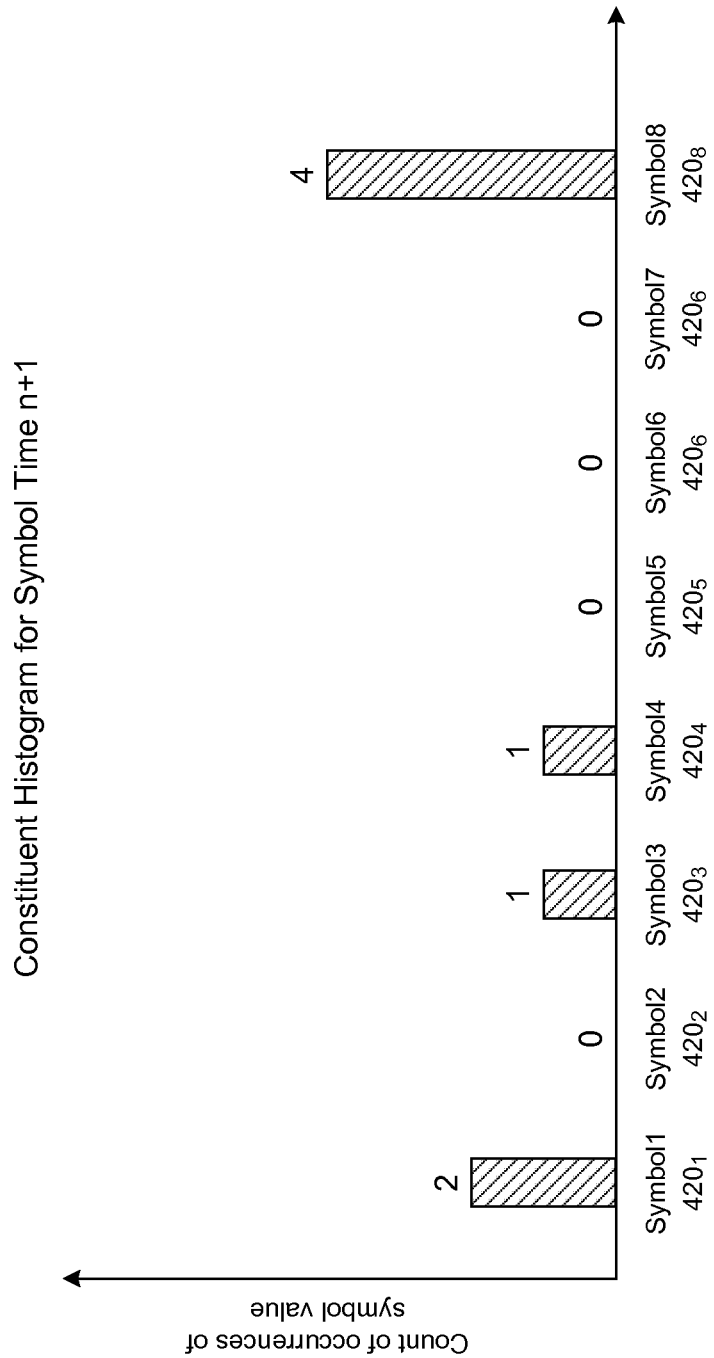
Figure 4C:
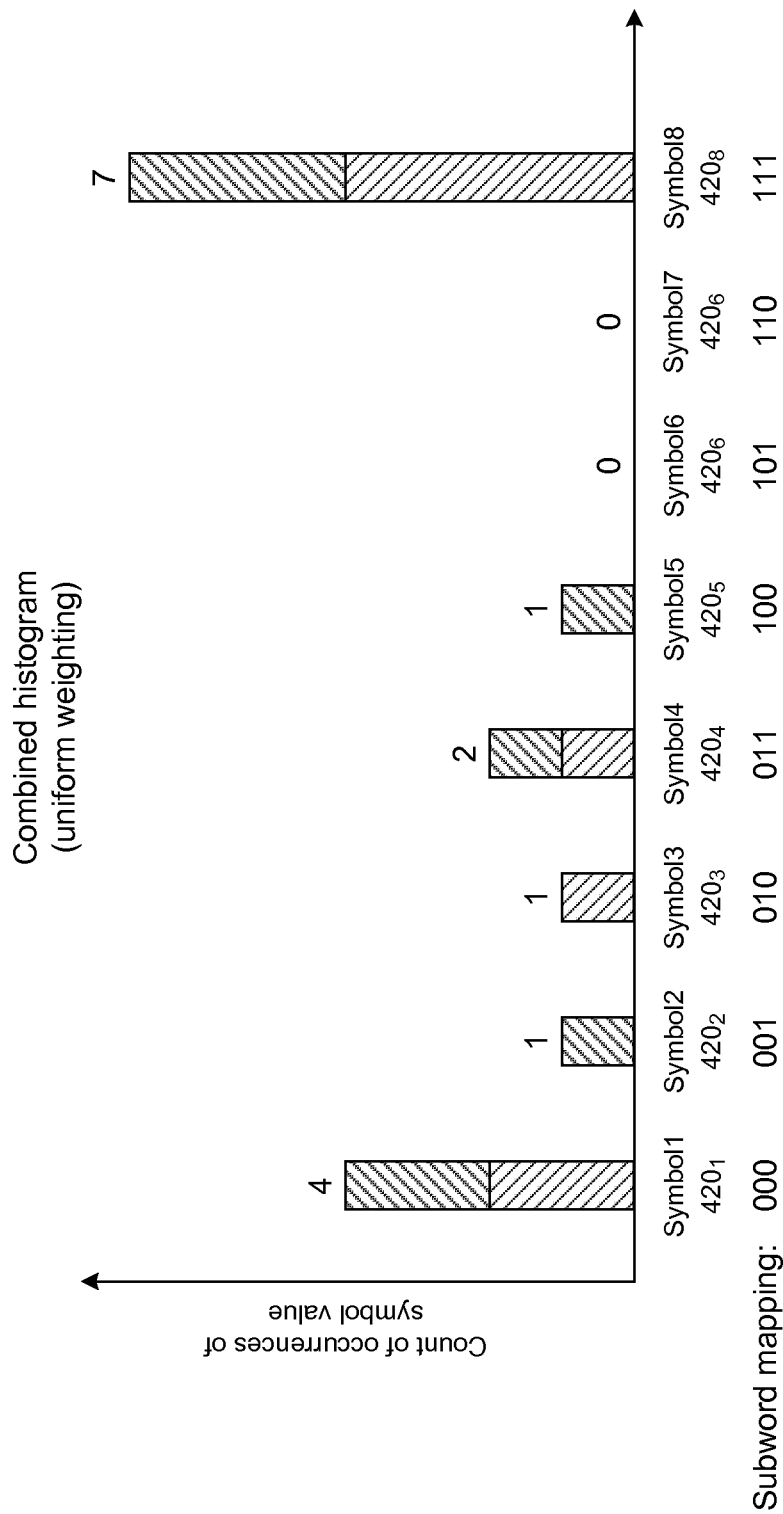
Figure 4D:
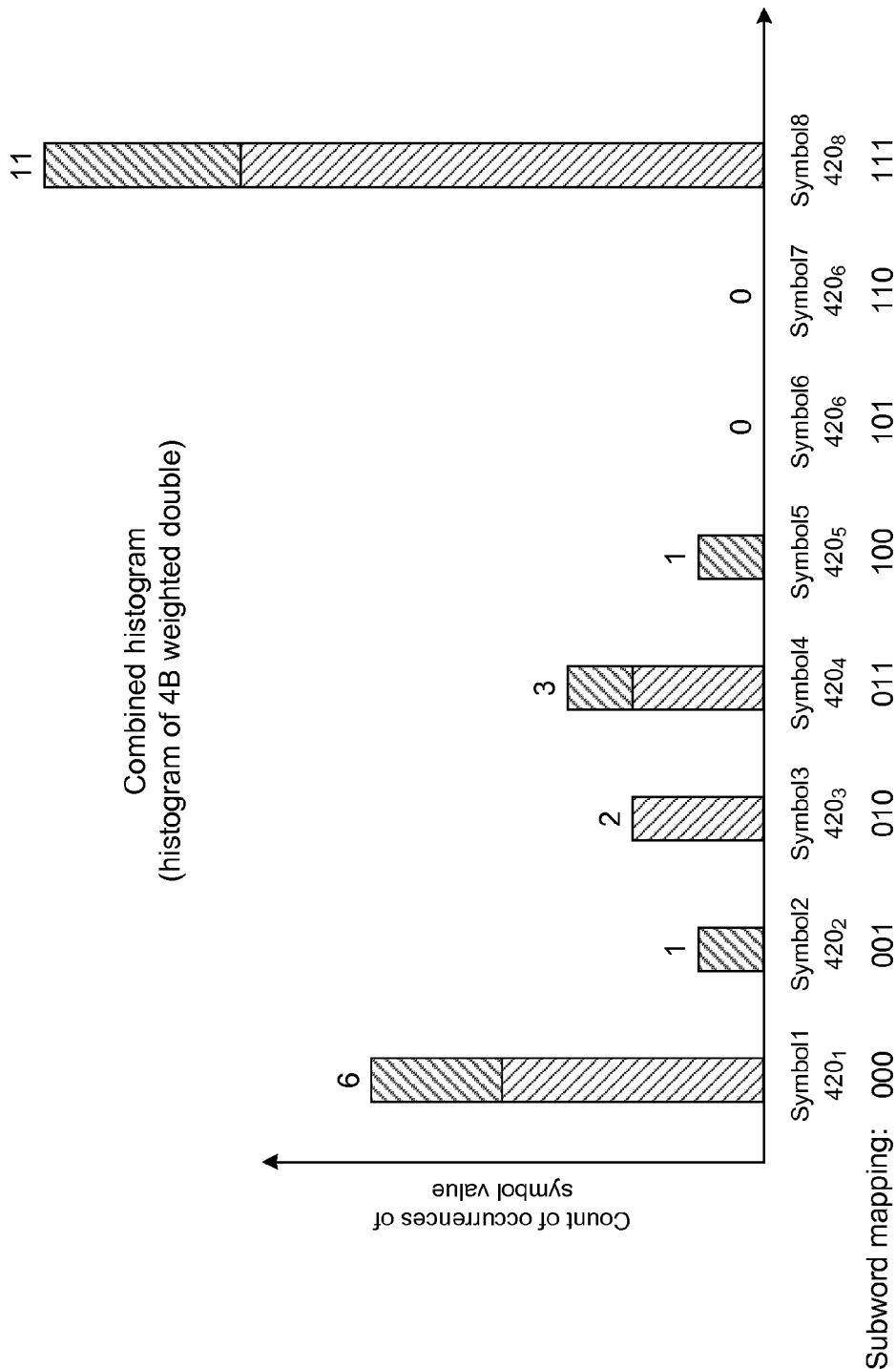

In each of FIGS. 4A and 4B, is shown an example constituent symbol value histogram for a particular transmitted symbol to be estimated. In each of FIGS. 4C and 4D is shown a combined histogram generated from the constituent histograms of FIGS. 4A and 4B.

The horizontal axis (x-axis) of the symbol value histograms in FIGS. 4A-4D represent the set of 8-QAM symbol values from which estimate symbol values are to be selected. The vertical axis (y-axis) of the symbol value histograms in FIG. 4A-4D represent a count of the number of times, at a particular decision delay within the observation region 312 of the survivors 300-303, that a particular received symbol was estimated to have a particular value. In another example implementation, the vertical axis may be a weighted count calculated using a predetermined rule.

As an example of a predetermined rule, occurrences of one or more values may be weighted by the aggregate metric of the survivor in which the occurrence occurred. This metric may scale as the log probability of the respective path. For example, if the metric for survivor 300 is M300 and the metric for survivor 301 is M301, then an occurrence in survivor 300 may count as f(M300) and an occurrence in survivor 301 may count as f(M301), where f( ) is a predefined function.

As another example of a predetermined rule, the count of occurrences for a particular symbol value may be set to the maximum count occurring for that symbol value in any one of the constituent histograms. For example, if two histograms are generated, "value1" is counted X times for symbol1 in the first histogram, a value of "value1" is counted Y times for symbol1 in the second histogram, and X>Y, then the count of "value1" for symbol1 may be set to X, where the first histogram was generated during one iteration of an RSSE process for a particular received symbol and the second histogram was generated during another iteration of the RSSE process for the same particular received symbol.

As another example of a predetermined rule, the count of occurrences for a particular symbol value may be set to the average count occurring for that symbol value over all of the constituent histograms. For example, if two histograms are generated, a value of "value1" is counted X times for symbol1 in the first histogram, and a value of "value1" is counted Y times for symbol1 in the second histogram, then the count of "value1" for symbol1 may be set to (X+Y)/2. These rules are merely examples for illustration. Other predefined rules are possible.

For simplicity of illustration, it is assumed the depth of the observation window 312 is two. The histogram of FIG. 4A corresponds to symbol time n, when the symbol of interest is in the first (left-most) position of the two-element observation window 312. The histogram of FIG. 4B corresponds to symbol time n+1, when the symbol of interest is in the second (right-most) position of the two-element observation window 312. A combined histogram may be generated via linear or nonlinear combination of the constituent histograms. FIGS. 4C and 4D illustrate two example combined histograms.

FIG. 4C shows a combined histogram generated using the constituent histograms of FIGS. 4A and 4B with uniform weighting (e.g., both histograms weighted by a factor of 1). For the histogram shown in FIG. 4C, the counts from FIG. 4A are simply added to the counts from FIG. 4B. Table 1 shows a few selected results for such an implementation.

TABLE 1

| Count (symbolx) | P(symbolx) |
|---|---|
| 1 | 1/16 |
| 4 | 4/16 |
| 8 | 8/16 |
| 12 | 12/16 |
| 15 | 15/16 |

FIG. 4D shows a combined histogram generated using non-uniform weighting of the constituent histograms of FIGS. 4A and 4B. The weights may increase as the symbol being estimated moves toward the convergence region (i.e., increase as the reliability of the estimates increase). For illustration, in FIG. 4D the histogram of FIG. 4A is given a weight of 1 and the histogram of FIG. 4B is given a weight of 2. Table 2 shows a few selected results for such an implementation.

TABLE 2

| Count (symbolx) | P (symbolx) |
|---|---|
| 1 | 1/24 |
| 6 | 4/24 |
| 12 | 8/24 |
| 18 | 12/24 |
| 23 | 15/24 |

Another example may help further illustrate implementations which use non-uniform weighting: Assume that the observation window depth is set to two. Further assume that, during the iteration of the sequence estimation process when the symbol to be estimated is in the first element of the observation region 312, the particular symbol is estimated to be "symbol3" in survivor 300, "symbol6" in survivor 301, "symbol6" in survivor 302, and "symbol3" in survivor 303. Further assume that, during the symbol time when the particular symbol is in the second (and, in this example, the last) element of the observation region 312, the particular symbol is estimated to be "symbol3" in survivor 300, "symbol6" in survivor 301, "symbol3" in survivor 302, and "symbol3" in survivor 303. Given these assumptions, in an example implementation using uniform weighting, the count for subword6 is 3 and the count for subword3 is 5. Conversely, in an example implementation using weighted counting, the count for subword6 is (2×F)+(1×T) and the count for subword3 is (2×F)+(3×T), where F is the weight applied for occurrences at the front of the observation region 312 and T is the weight applied for occurrences at the tail of the observation region 312 (e.g., T>F).

Figure 4E:
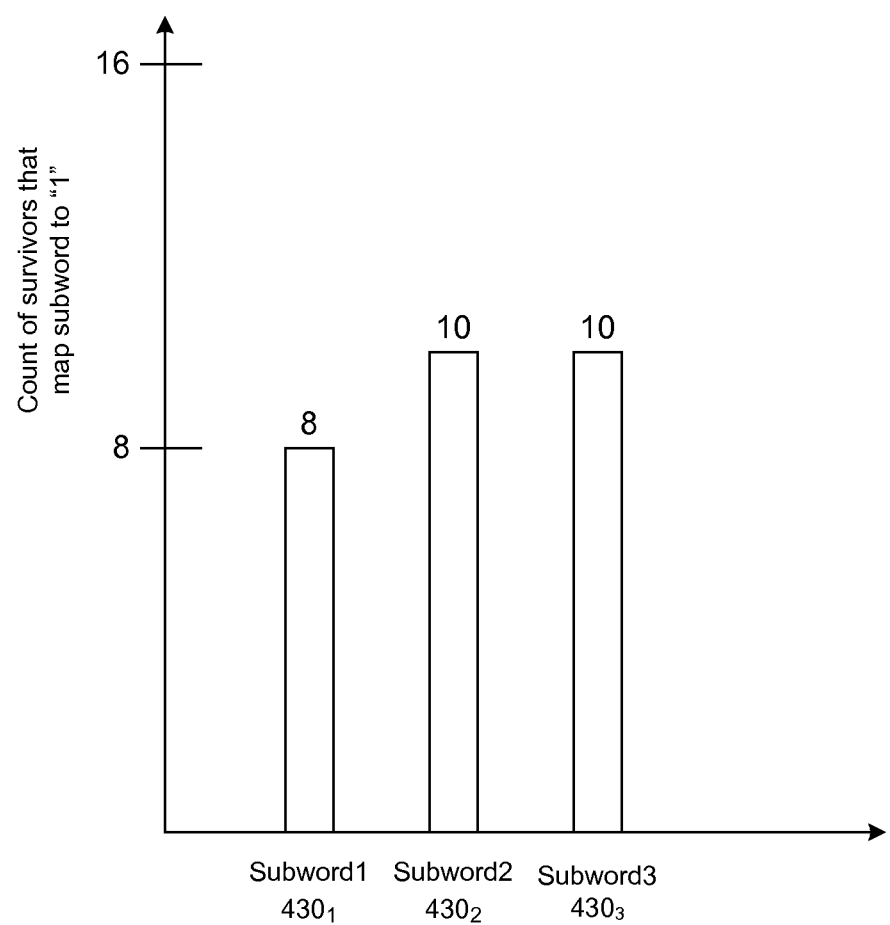
Figure 4F:
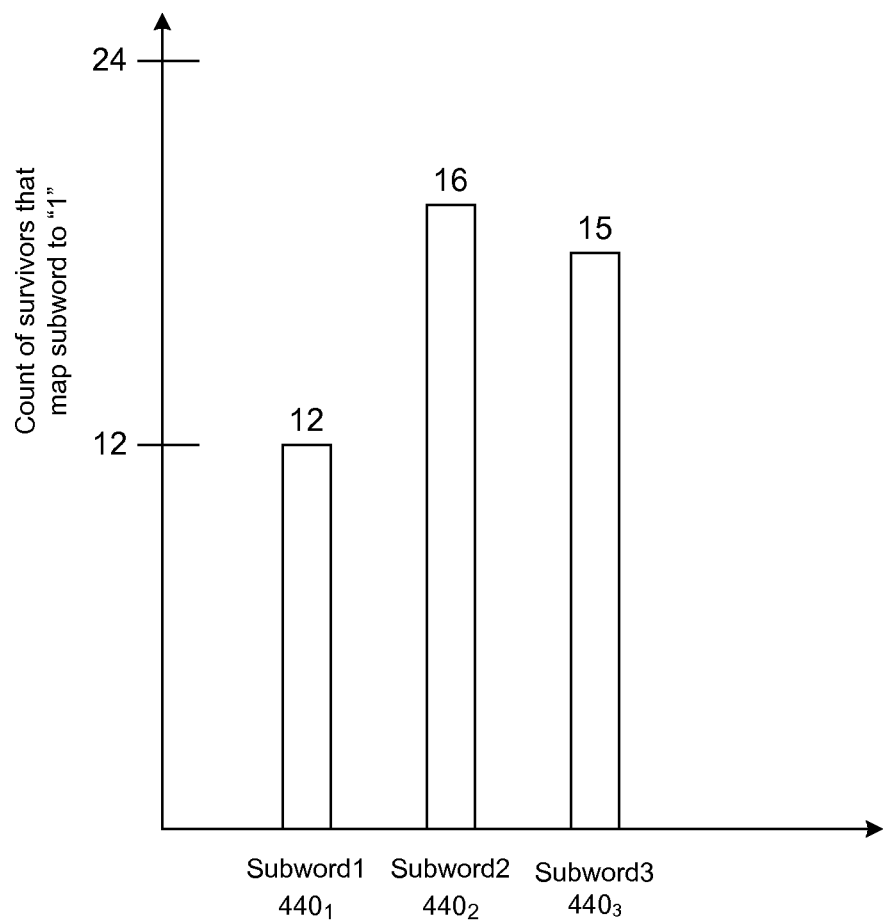

In an example implementation, described with respect to FIGS. 4E and 4F, the symbol values may be mapped to subword values, and then LLRs may be calculated for the subwords.

In an example implementation, the LLRs may be processed by a predefined SNR-dependent or SNR-independent function in order to better match the LLRs calculated based on the histograms of the RSSE system to LLRs which would have been obtained had full state information been available. For example, as each final symbol histogram is derived from multiple (dependent) histograms for different decision delays, some post calculation compression function may be employed in order partially remove the correlation between the constituent histograms.

In an example implementation, the constituent and/or combined histograms may be modified based on information beyond the estimates within the observation region. For example, subword occurrences outside of the observation window in the best symbol survivor (the symbol survivor having the lowest metric) may be included in the counts. Along these lines, the size of the observation window may vary across the survivors with the observation window for a particular survivor being determined based on that survivors calculated branch metric. Likewise, the observation window need not necessarily comprise a range of consecutive decision delays but some set of non-consecutive delays.

Also shown in FIGS. 4C and 4D is a subword mapping for the example 8-QAM symbol constellation. This mapping may be used to generate the histograms shown in FIGS. 4E and 4F.

Referring to FIG. 4E, the total count of "1"s for subword1 in FIG. 4C is 8, the total count of "1"s for subword2 in FIG. 4C is 10 and the total count of "1"s for subword3 in FIG. 4C is 10. The corresponding LLRs are shown in table 3.

TABLE 3

| Subword | P("1") | LLR |
|---|---|---|
| 1 | 8/16 | 0 |
| 2 | 10/16 | −0.22 |
| 3 | 10/16 | −0.22 |

Referring to FIG. 4F, the total count of "1"s for subword1 in FIG. 4D is 12, the total count of "1"s for subword2 in FIG. 4D is 16 and the total count of "1"s for subword3 in FIG. 4D is 15. The corresponding LLRs are shown in table 4.

TABLE 4

| Subword | P ("1") | LLR |
|---|---|---|
| 1 | 12/24 | 0 |
| 2 | 16/24 | −0.30 |
| 3 | 15/24 | −0.22 |

In an example implementation, circuitry of a receiver (e.g., 130) may be operable to receive an inter-symbol correlated (ISC) signal (e.g., 201), and generate a plurality of soft decisions (e.g., 240) as to information carried in the ISC signal. The soft decisions may be generated using a reduced-state sequence estimation (RSSE) process. The RSSE process may be such that the number of symbol survivors retained after each iteration of the RSSE process is less than the maximum likelihood state space. The soft decisions may be made available to a forward error correction (FEC) decoder (e.g., via an inter-chip or intra-chip signal bus). The ISC signal may be received via a channel having a significant amount of nonlinearity. The nonlinearity may degrade performance metric in the circuitry by less than 1 dB, relative to a perfectly linear channel, whereas, in a full response communication system, such an amount of nonlinearity would degrade the performance metric by 1 dB or more, relative to a perfectly linear channel. The plurality of soft decisions may comprise a plurality of log likelihood ratios (LLRs). Each of the plurality of LLRs may correspond to a respective one of a plurality of subwords of a forward error correction (FEC) codeword. The RSSE process may comprise generation of a plurality of symbol survivor vectors, and analysis of contents of the plurality of symbol survivor vectors. The analysis may comprise determining a measure of probability, within an observation region of the plurality of symbol survivor vectors, for each one of a plurality of possible values of the ISC signal (e.g., a probability for each of the 8-QAM values in FIGS. 4A-4F). The measure of probability may be modified based on occurrences of one or more of the possible values outside the observation region in a best symbol survivor (e.g., modify the measure of probability based on symbol value occurrences outside the region 312 in the symbol survivor 300, where 300 is the best symbol survivor). The measure of probability for any particular possible value of the ISC signal may be a count of occurrences of the particular possible value within the observation region (e.g., counting occurrences of estimated values within an observation region 312 of the survivors 300-303). The possible values of the ISC signal may be symbol constellation values and/or FEC subword values.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for improving BER performance based on a sequence estimation algorithm and FEC.

Accordingly, aspects of the present disclosure may be realized in hardware, software, or a combination of hardware and software. Aspects of the present disclosure may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Aspects of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A system comprising:
signal processing circuitry and sequence estimation circuitry, wherein:
said signal processing circuitry is operable to receive an inter-symbol correlated signal resulting from a transmitted plurality of symbols, each of said plurality of symbols corresponding to a plurality of subwords;
said signal processing circuitry is operable to output samples of said received inter-symbol correlated signal to said sequence estimation circuitry;
said sequence estimation circuitry is operable to process said samples using a sequence estimation process in which each iteration of said sequence estimation process comprises generation of multiple survivor vectors; and
said sequence estimation circuitry is operable to generate soft-decisions as to values of said plurality of symbols and/or said plurality of subwords based on a count of occurrences of a particular symbol and/or subword value in said multiple survivor vectors.

2. The system of claim 1, wherein:
a weight is applied to each one of said occurrences during generation of said count of occurrences; and
said weight is based on which one of said multiple survivor vectors said one of said occurrences is in.

3. The system of claim 2, wherein said weight applied to said one of said occurrences is based on a metric calculated for said one of said multiple survivor vectors.

4. The system of claim 1, wherein:
when said one of said multiple survivor vectors is a first survivor vector having a first metric, said weight applied to said one of said occurrences is a first weight based on said first metric; and
when said one of said multiple survivor vectors is a second survivor vector having a second metric, said weight applied to said one of said occurrences is a second weight based on said second metric.

5. The system of claim 1, wherein said count of occurrences includes multiple decision delays in said multiple survivor vectors.

6. The system of claim 5, wherein:
a weight is applied to each one of said occurrences during generation of said count of occurrences; and
said weight is based on which one of said multiple decision delays said one of said occurrences is at.

7. The system of claim 6, wherein:
when said one of said occurrences is at a first one of said decision delays, said weight is a first weight; and
when said one of said occurrences is at a second one of said decision delays, said weight is a second weight.

8. The system of claim 1, wherein said sequence estimation circuitry is operable to process said soft-decisions using a signal-to-noise ratio (SNR)-dependent function.

9. The system of claim 1, wherein one of said soft-decisions corresponding to one of said plurality of symbols or said plurality of subwords is based on a ratio of said count of occurrences of said particular symbol and/or subword value in said multiple survivor vectors to a count of occurrences of one or more other symbol and/or subword values in said multiple survivor vectors.

10. The system of claim 1, wherein each of said plurality of symbols is a quadrature amplitude modulation (QAM) symbol and each of said plurality of subwords is a bit.

11. A method comprising:
performing in a receiver comprising signal processing circuitry and sequence estimation circuitry:
receiving, by said signal processing circuitry, an inter-symbol correlated signal resulting from a transmitted plurality of symbols, each of said plurality of symbols corresponding to a plurality of subwords;
outputting, by said signal processing circuitry, samples of said received inter-symbol correlated signal to said sequence estimation circuitry;
processing, by said sequence estimation circuitry, said samples using a sequence estimation process in which each iteration of said sequence estimation process comprises generating multiple survivor vectors; and
generating, by said sequence estimation circuitry, soft-decisions as to values of said plurality of symbols and/or said plurality of subwords based on a count of occurrences of a particular symbol and/or subword value in said multiple survivor vectors.

12. The method of claim 11, comprising: applying, by said sequence estimation circuitry, a weight to each one of said occurrences as part of generating said count of occurrences, wherein said weight is based on which one of said multiple survivor vectors said one of said occurrences is in.

13. The method of claim 12, wherein said weight applied to said one of said occurrences is based on a metric calculated for said one of said multiple survivor vectors.

14. The method of claim 11, wherein:
when said one of said multiple survivor vectors is a first survivor vector having a first metric, said weight applied to said one of said occurrences is a first weight based on said first metric; and
when said one of said multiple survivor vectors is a second survivor vector having a second metric, said weight applied to said one of said occurrences is a second weight based on said second metric.

15. The method of claim 11, wherein said count of occurrences includes multiple decision delays in said multiple survivor vectors.

16. The method of claim 15, comprising:
applying, by said sequence estimation circuitry, a weight to each one of said occurrences as part of generating of said count of occurrences, wherein said weight is based on which one of said multiple decision delays said one of said occurrences is at.

17. The method of claim 16, wherein:
when said one of said occurrences is at a first one of said decision delays, said weight is a first weight; and
when said one of said occurrences is at a second one of said decision delays, said weight is a second weight.

18. The method of claim 11, comprising processing, by said sequence estimation circuitry, said soft-decisions using a signal-to-noise ratio (SNR)-dependent function.

19. The method of claim 11, wherein one of said soft-decisions corresponding to one of said plurality of symbols or said plurality of subwords is based on a ratio of said count of occurrences of said particular symbol and/or subword value in said multiple survivor vectors to a count of occurrences of one or more other symbol and/or subword values in said multiple survivor vectors.

20. The method of claim 11, wherein each of said plurality of symbols is a quadrature amplitude modulation (QAM) symbol and each of said plurality of subwords is a bit.

* * * * *